United States Patent
Henry et al.

(10) Patent No.: US 9,702,297 B2
(45) Date of Patent: Jul. 11, 2017

(54) METHOD AND SYSTEMS FOR ADJUSTING A TURBINE BYPASS VALVE

(71) Applicant: General Electric Company, Schenectady, NY (US)

(72) Inventors: Luke Michael Henry, Erie, PA (US); James Robert Mischler, Girard, PA (US); Samuel Lyle Hazen, Mayville, NY (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 14/506,893

(22) Filed: Oct. 6, 2014

(65) Prior Publication Data
US 2016/0097318 A1    Apr. 7, 2016

(51) Int. Cl.
| F02B 33/44 | (2006.01) |
| F02B 37/18 | (2006.01) |
| F02D 41/00 | (2006.01) |
| F02D 41/14 | (2006.01) |

(52) U.S. Cl.
CPC ............ F02B 37/183 (2013.01); F02B 37/18 (2013.01); F02D 41/0007 (2013.01); F02D 41/144 (2013.01); *Y02T 10/144* (2013.01)

(58) Field of Classification Search
CPC ...... F02B 37/18; F02B 37/183; F02B 38/186; F02B 37/22; F02B 37/24
USPC ........................................ 60/602, 611, 612
See application file for complete search history.

(56) References Cited

U.S. PATENT DOCUMENTS

| 4,286,433 | A | 9/1981 | Detweiler |
| 5,036,663 | A | 8/1991 | Akagi et al. |
| 6,718,767 | B1 * | 4/2004 | Caddy ............... F02B 37/24 60/602 |
| 7,509,803 | B2 | 3/2009 | Panciroli |
| 7,958,730 | B2 | 6/2011 | Stewart |
| 8,087,402 | B2 * | 1/2012 | Burkhardt ...... F02D 41/0007 60/602 |
| 8,191,369 | B2 | 6/2012 | Geyer |
| 2005/0172627 | A1 * | 8/2005 | Baize ............... F02D 23/00 60/602 |
| 2009/0090107 | A1 * | 4/2009 | Youssef ......... F02D 41/0007 60/602 |

(Continued)

FOREIGN PATENT DOCUMENTS

| CN | 1896471 B | 8/2010 | |
| FR | 2922596 A1 * | 4/2009 | ......... F02D 41/0007 |

(Continued)

OTHER PUBLICATIONS

European Search Report and Written Opinion issued in connection with corresponding EP Application No. 15188128.1-1606 dated Mar. 22, 2016.

*Primary Examiner* — Phutthiwat Wongwian
*Assistant Examiner* — Ngoc T Nguyen
(74) *Attorney, Agent, or Firm* — Global Patent Operation; John A. Kramer (57) ABSTRACT

Various methods and systems are provided for adjusting a turbine boost control actuator based on a single common reference value. In one example, a method for an engine includes adjusting a turbine boost control actuator to control an intake manifold pressure to a limit, the limit based at least in part on one or more of peak cylinder pressure, turbine speed, and a pressure difference across a turbine.

20 Claims, 6 Drawing Sheets

(56) References Cited

U.S. PATENT DOCUMENTS

| | | | |
|---|---|---|---|
| 2013/0098033 A1* | 4/2013 | Murakami | F02B 37/18 60/602 |
| 2014/0325979 A1* | 11/2014 | Morelli | F02B 37/183 60/599 |
| 2014/0328665 A1* | 11/2014 | Glugla | F02B 37/18 415/1 |
| 2015/0240706 A1 | 8/2015 | Yamagata et al. | |

FOREIGN PATENT DOCUMENTS

| | | |
|---|---|---|
| JP | H0544485 A | 2/1993 |
| WO | 2014091717 A1 | 6/2014 |

* cited by examiner

METHOD AND SYSTEMS FOR ADJUSTING A TURBINE BYPASS VALVE

BACKGROUND

Technical Field

Embodiments of the subject matter disclosed herein relate to adjusting operation of an engine.

Discussion of Art

Turbocharging an engine allows the engine to provide power similar to that of a larger displacement engine. Thus, turbocharging can extend the operating region of an engine. Turbochargers function by compressing intake air in a compressor driven by a turbine operated by exhaust gas flow. The turbine may include a turbine bypass valve arranged in a bypass passage around the turbine. As such, the turbine bypass valve may be adjusted to divert exhaust flow around the turbine, thereby decreasing boost provided by the compressor. Under certain conditions, decreased boost may be requested. In one example, the turbine bypass valve may be adjusted to maintain a plurality of engine operating conditions below a set of upper operating limits. For example, the turbine bypass valve may be adjusted in order to maintain turbine speed, peak cylinder pressure, and a pressure difference across the turbine below corresponding upper operating limits in order to reduce engine component degradation. However, adjusting the turbine bypass valve based on multiple variables relative to multiple upper limits may increase the control complexity of controlling the turbine bypass valve.

BRIEF DESCRIPTION

In one embodiment, a method for an engine (e.g., a method for controlling an engine system) comprises adjusting a turbine boost control actuator to control an intake manifold pressure to a limit, the limit based at least in part on one or more of peak cylinder pressure, turbine speed, and/or a pressure difference across a turbine.

DETAILED DESCRIPTION

The following description relates to embodiments of adjusting a turbine boost control actuator to control an intake manifold pressure to a limit, the limit based at least in part on one or more of peak cylinder pressure, turbine speed, and a pressure difference across the turbine. In one example, the turbine boost control actuator may be a turbine bypass valve. The turbine bypass valve may be a valve adjustable into a plurality of positions to adjust an amount of airflow diverted around a turbocharger turbine in an exhaust passage of an engine. In another example, the turbine boost control actuator may be an actuator of a variable geometry turbine (VGT). In yet another example, the turbine boost control actuator may be another type of actuator adjusting the intake manifold pressure to the limit. The limit may be an upper intake manifold pressure limit. An engine controller may adjust the turbine boost control actuator in order to maintain the intake manifold pressure below this limit. Additionally, the limit may be a limit having a common unit. In one example, the common unit may be units of pressure, and particularly a scaled intake manifold pressure. In alternate embodiments, the common unit may be an alternate unit such as an alternate scaled pressure, fresh air flow, or turbine speed.

Figure 1:
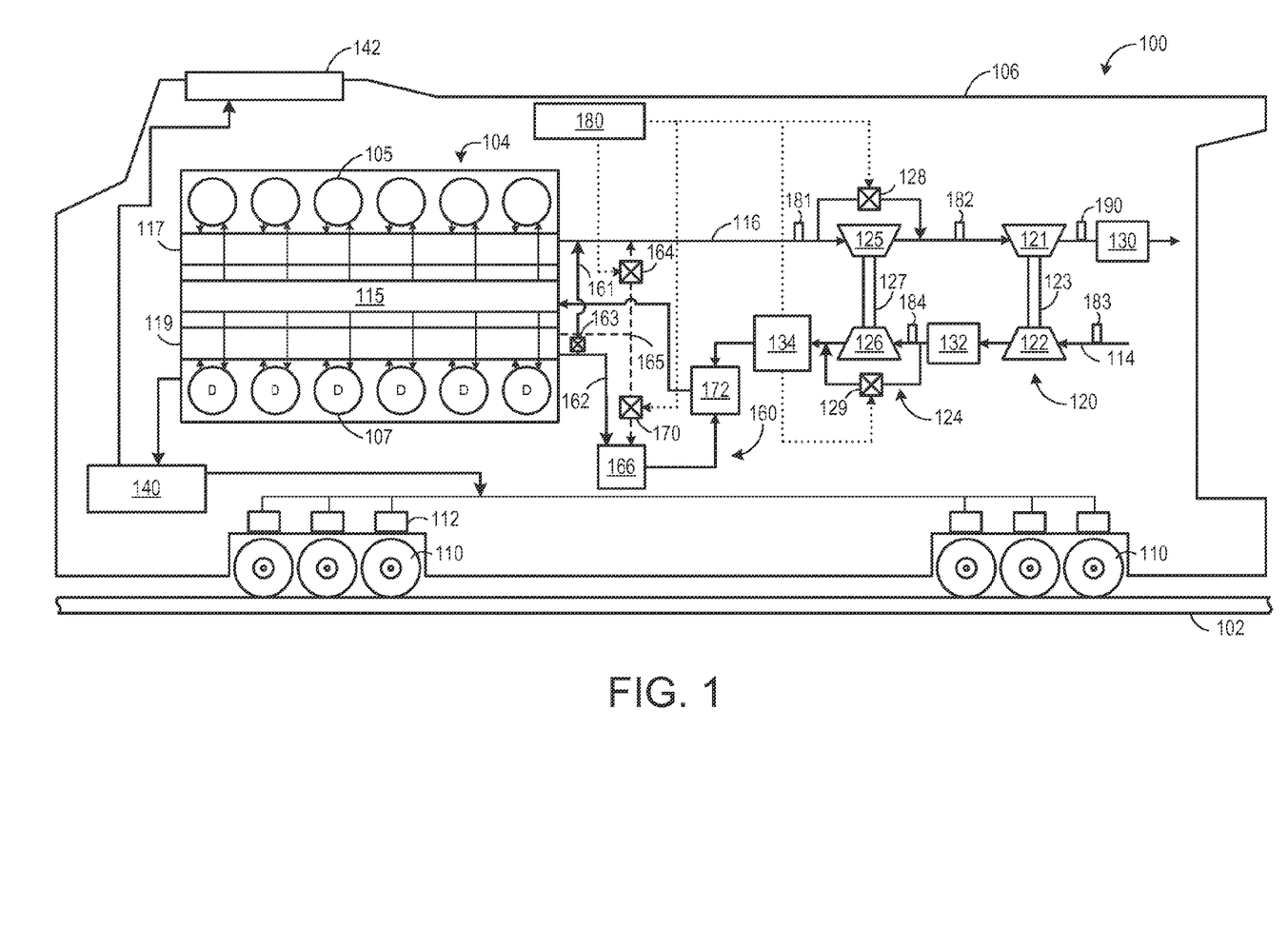
FIG. 1 shows a schematic diagram of a rail vehicle with an engine according to an embodiment of the invention.
Figure 2:
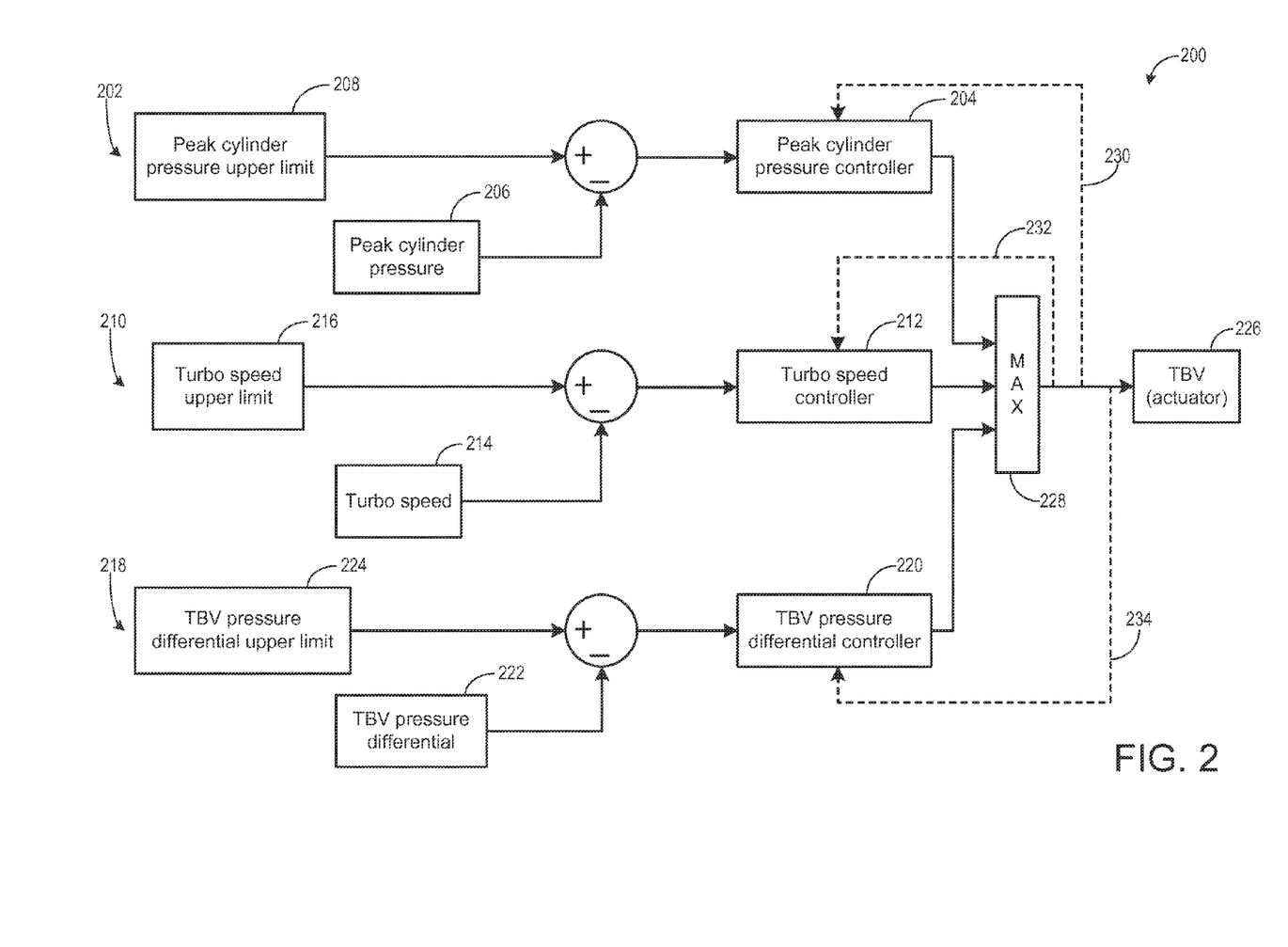
FIG. 2 shows a schematic of a first control scheme for adjusting a turbine bypass valve according to an embodiment of the invention.

As shown in FIG. 1, an engine system may include one or more turbochargers including a compressor driven by a turbine. The turbine may include a turbine bypass valve (TBV) configured to divert exhaust around the turbine, thereby reducing boost delivered by the compressor to the engine. A position of the TBV may be adjusted based on peak cylinder pressure, turbocharger speed, and a pressure difference across the TBV relative to respective upper limits. In one example, as shown in FIG. 2, the engine controller may adjust the TBV based on input from three different control loops—one for each of the peak cylinder pressure, turbocharger speed, and pressure difference across the TBV. However, controlling the TBV in this way may increase control complexity. Instead, the three different input variables (peak cylinder pressure, turbine speed, and pressure difference across the TBV) may be converted to a common reference value, such as intake manifold pressure (MAP), as shown in FIGS. 3-6. Three different MAP limits may be determined based on the three different input variables. A single control loop may then adjust the TBV based on a minimum of the MAP limits and a measured or estimated MAP value. In this way, a single control loop may be used to actuate the TBV with a single actuator. A method for adjusting the TBV based on a common MAP limit based on multiple different input variables is shown at FIG. 7.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for adjusting a turbine bypass valve using a single control loop and multiple input variables, an example of a platform is disclosed in which the engine system may be installed in a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle includes an engine 104. In other non-limiting embodiments, the engine may be a stationary engine, such as in a power-plant application, or an engine in a marine vessel or off-highway vehicle propulsion system as noted above.

The engine receives intake air for combustion from an intake, such as an intake manifold 115. The intake may be any suitable conduit or conduits through which gases flow to enter the engine. For example, the intake may include the intake manifold, an intake passage 114, and the like. The intake passage receives ambient air from an air filter (not shown) that filters air from outside of a vehicle in which the engine may be positioned. Exhaust gas resulting from combustion in the engine is supplied to an exhaust, such as exhaust passage 116. The exhaust may be any suitable conduit through which gases flow from the engine. For example, the exhaust may include an exhaust manifold 117, the exhaust passage, and the like. Exhaust gas flows through the exhaust passage, and out of an exhaust stack of the rail vehicle. In one example, the engine is a diesel engine that combusts air and diesel fuel through compression ignition. In other non-limiting embodiments, the engine may combust fuel including gasoline, kerosene, biodiesel, or other petroleum distillates of similar density through compression ignition (and/or spark ignition).

In one embodiment, the rail vehicle is a diesel-electric vehicle. As depicted in FIG. 1, the engine is coupled to an electric power generation system, which includes an alternator/generator 140 and electric traction motors 112. For example, the engine is a diesel engine that generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of a plurality of wheels to provide tractive power to propel the rail vehicle. One example configuration includes one traction motor per wheel. As depicted herein, six pairs of traction motors correspond to each of six pairs of wheels of the rail vehicle. In another example, alternator/generator may be coupled to one or more resistive grids 142. The resistive grids may be configured to dissipate excess engine torque via heat produced by the grids from electricity generated by alternator/generator.

In the embodiment depicted in FIG. 1, the engine is a V-12 engine having twelve cylinders. In other examples, the engine may be a V-6, V-8, V-10, V-16, I-4, I-6, I-8, opposed 4, or another engine type. As depicted, the engine may include a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders. In yet another embodiment, the engine may not include any donor cylinders and instead include only non-donor cylinders.

As depicted in FIG. 1, the non-donor cylinders are coupled to the exhaust passage to route exhaust gas from the engine to atmosphere (after it passes through an optional exhaust gas treatment system 130 and first and second turbochargers 120 and 124). The donor cylinders, which provide engine exhaust gas recirculation (EGR), are coupled exclusively to an EGR passage 162 of an EGR system 160 which routes exhaust gas from the donor cylinders to the intake passage of the engine, and not to atmosphere. By introducing cooled exhaust gas to the engine, the amount of available oxygen for combustion is decreased, thereby reducing combustion flame temperatures and reducing the formation of nitrogen oxides (e.g., $NO_x$).

Exhaust gas flowing from the donor cylinders to the intake passage passes through a heat exchanger such as an EGR cooler 166 to reduce a temperature of (e.g., cool) the exhaust gas before the exhaust gas returns to the intake passage. The EGR cooler may be an air-to-liquid heat exchanger, for example. In such an example, one or more charge air coolers 132 and 134 disposed in the intake passage (e.g., upstream of where the recirculated exhaust gas enters) may be adjusted to further increase cooling of the charge air such that a mixture temperature of charge air and exhaust gas is maintained at a desired temperature. In other examples, the EGR system may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage rather than the intake passage.

Additionally, in some embodiments, the EGR system may include an EGR bypass passage 161 that is configured to divert exhaust from the donor cylinders back to the exhaust passage. The EGR bypass passage may be controlled via a first valve 163. The first valve may be configured with a plurality of restriction points such that a variable amount of exhaust is routed to the exhaust, in order to provide a variable amount of EGR to the intake.

In an alternate embodiment shown in FIG. 1, the donor cylinders may be coupled to an alternate EGR passage 165 (illustrated by the dashed lines) that is configured to selectively route exhaust to the intake or to the exhaust passage. For example, when a second valve 170 is open, exhaust may be routed from the donor cylinders to the EGR cooler and/or additional elements prior to being routed to the intake passage. Further, the alternate EGR system includes a third valve 164 disposed between the exhaust passage and the alternate EGR passage.

The third valve and second valve may be on/off valves controlled by the control unit 180 (for turning the flow of EGR on or off), or they may control a variable amount of EGR, for example. In some examples, the third valve may be actuated such that an EGR amount is reduced (exhaust gas flows from the alternate EGR passage to the exhaust passage). In other examples, the third valve may be actuated such that the EGR amount is increased (e.g., exhaust gas flows from the exhaust passage to the alternate EGR passage). In some embodiments, the alternate EGR system may include a plurality of EGR valves or other flow control elements to control the amount of EGR.

In such a configuration, the third valve 164 is operable to route exhaust from the donor cylinders to the exhaust passage of the engine and the second valve 170 is operable to route exhaust from the donor cylinders to the intake passage of the engine. As such, the third valve may be referred to as an EGR bypass valve, while the second valve may be referred to as an EGR metering valve. In the embodiment shown in FIG. 1, the third valve and the second valve may be engine oil, or hydraulically, actuated valves, for example, with a shuttle valve (not shown) to modulate the engine oil. In some examples, the valves may be actuated such that one of the third and second valves is normally open and the other is normally closed. In other examples, the third and second valves may be pneumatic valves, electric valves, or another suitable valve.

As shown in FIG. 1, the vehicle system further includes an EGR mixer 172 which mixes the recirculated exhaust gas with charge air such that the exhaust gas may be evenly distributed within the charge air and exhaust gas mixture. In the embodiment depicted in FIG. 1, the EGR system is a high-pressure EGR system which routes exhaust gas from a location upstream of the turbochargers in the exhaust passage to a location downstream of the turbochargers in the intake passage. In other embodiments, the vehicle system may additionally or alternatively include a low-pressure EGR system which routes exhaust gas from downstream of the turbochargers in the exhaust passage to a location upstream of the turbochargers in the intake passage.

As depicted in FIG. 1, the vehicle system may further include a two-stage turbocharger with the first turbocharger 120 and the second turbocharger 124 arranged in series, each of the turbochargers arranged between the intake passage and the exhaust passage. The two-stage turbocharger increases air charge of ambient air drawn into the intake passage in order to provide greater charge density during combustion to increase power output and/or engine-operating efficiency. The first turbocharger operates at a relatively lower pressure, and includes a first turbine 121 which drives a first compressor 122. The first turbine and the first compressor are mechanically coupled via a first shaft 123. The first turbocharger may be referred to the "low-pressure stage" of the turbocharger. The second turbocharger operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In alternate embodiments, the engine system may only include a single stage turbocharger with only a single turbine and single compressor.

In the embodiment shown in FIG. 1, the second turbocharger is provided with a turbine bypass valve (TBV) 128 which allows exhaust gas to bypass the second turbocharger. The turbine bypass valve may be opened, for example, to divert the exhaust gas flow away from and around the second turbine. In this manner, the rotating speed of the second compressor, and thus the boost provided by the turbochargers to the engine may be regulated. For example, by increasing the opening of the TBV, the speed of the turbine and thus the compressor mechanically coupled with the turbine may decrease, thereby decreasing boost provided to the engine. Decreasing boost may decrease an intake manifold pressure (MAP) of the engine. As described further below, a position of the TBV may be adjusted based on a plurality of engine operating conditions.

Additionally, the first turbocharger may also be provided with a turbine bypass valve. In other embodiments, only the first turbocharger may be provided with a turbine bypass valve, or only the second turbocharger may be provided with a turbine bypass valve. Additionally, the second turbocharger may be provided with a compressor bypass valve 129, which allows gas to bypass the second compressor 126 to avoid compressor surge, for example. In some embodiments, the first turbocharger may also be provided with a compressor bypass valve, while in other embodiments, only first turbocharger may be provided with a compressor bypass valve.

The vehicle system further includes the exhaust treatment system coupled in the exhaust passage in order to reduce regulated emissions. As depicted in FIG. 1, the exhaust gas treatment system is disposed downstream of the first turbine of the first (low pressure) turbocharger. In other embodiments, an exhaust gas treatment system may be additionally or alternatively disposed upstream of the first turbocharger. The exhaust gas treatment system may include one or more components. For example, the exhaust gas treatment system may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof. In alternate embodiments, the vehicle system may not include the exhaust aftertreatment system.

The exhaust passage may further include an exhaust gas sensor 190. The exhaust gas sensor measures an exhaust emission value (e.g., level) of the exhaust gas. For example, the exhaust gas sensor may measure a content of the exhaust gas. In one example, the exhaust emission value may be an amount of oxygen and/or NOx in the exhaust gas. As such, the exhaust gas sensor may measure both an oxygen and NOx level of the exhaust gas flowing through the exhaust passage. In another example, the exhaust passage may include two exhaust gas sensors, a first measuring exhaust oxygen content and a second measuring exhaust NOx content. The exhaust gas sensor is shown positioned downstream from the turbochargers and upstream of the exhaust gas treatment system. However, in alternate embodiments the exhaust gas sensor may be positioned in alternate locations in the exhaust passage, such as upstream of the turbochargers or between the two turbocharger stages. The exhaust gas sensor may alternatively be positioned in orificed side-sample lines that bypass the one or more turbines. In one example, the exhaust gas sensor may be a universal exhaust gas oxygen sensor (UEGO) or another appropriate exhaust constituent sensor.

The vehicle system further includes the control unit, which is provided and configured to control various components related to the vehicle system. In one example, the control unit includes a computer control system (e.g., a controller). The control unit further includes non-transitory, computer readable storage media (not shown) including code for enabling on-board monitoring and control of engine operation. The control unit, while overseeing control and management of the vehicle system, may be configured to receive signals from a variety of engine sensors, as further elaborated herein, in order to determine operating parameters and operating conditions, and correspondingly adjust various engine actuators to control operation of the vehicle system. For example, the control unit may receive signals from various engine sensors including sensor 181 arranged in the inlet of the high-pressure turbine, sensor 182 arranged in the inlet of the low-pressure turbine, sensor 183 arranged in the inlet of the low-pressure compressor, sensor 184 arranged in the inlet of the high-pressure compressor, and the exhaust gas sensor. The sensors arranged in the inlets of the turbochargers may detect air temperature and/or pressure. In one example, a pressure difference across the TBV (and high pressure turbine) may be determined based on a difference between turbine inlet pressure (measured by sensor 181) and turbine outlet pressure (measure by sensor 182). The second turbocharger may also include a sensor for measuring turbine speed (e.g., high pressure turbine speed). It should be noted that turbine speed and turbocharger speed may be used interchangeably throughout the disclosure, as the turbocharger turbine drives the turbocharger compressor. Further, the engine may include a sensor for measuring peak cylinder pressure.

Additional sensors may include, but are not limited to, engine speed, engine load, boost pressure, ambient pressure, exhaust temperature, exhaust pressure, etc. Correspondingly, the control unit may control the vehicle system by sending commands to various components such as traction motors, alternator, cylinder valves, throttle, heat exchangers, wastegates or other valves or flow control elements, etc. For example, the controller may send commands to an actuator of the TBV, thereby adjusting a position of the TBV based on the received command.

As introduced above, the TBV regulates intake manifold pressure (MAP), which simultaneously limits peak cylinder pressure, turbocharger speed (e.g., high pressure turbine speed), and a pressure differential across the TBV. Thus, the TBV may be adjusted based on one or more of MAP, peak cylinder pressure, turbine speed, and/or a pressure differential across the TBV (or turbine). In order to protect the engine, peak cylinder pressure may be maintained below an upper peak cylinder pressure threshold (e.g., limit). Further, excessive turbocharger speeds may result in degradation of turbocharger components. As such, the turbocharger speed (e.g., turbine speed) may be maintained below an upper turbine (e.g., turbo) speed threshold (e.g., limit). Additionally, if the pressure differential across the TBV (determined based on a difference between turbine inlet and outlet pressure) increases above a threshold, the valve actuator may have torque authority issues. For example, normal forces on the butterfly plate of the TBV may be influenced by the pressure differential across the TBV. If these normal forces increase above a threshold, the bearings of the valve may bind, thereby decreasing rotation of the butterfly valve and degrading operation of the TBV. Thus, the pressure differential across the TBV may be maintained below an upper TBV pressure differential threshold (e.g., limit) to reduce binding and degradation of the TBV components.

In one example, the TBV may be adjusted to maintain the turbine speed, peak cylinder pressure, and/or pressure differential across the TBV within a set range of values, or below their respective upper threshold values. As a result, engine component degradation may be reduced while increasing engine performance. In one example, as shown in FIG. 2, the engine controller may adjust the TBV based on input from three different control loops—one for each of the peak cylinder pressure, turbocharger speed, and pressure difference across the TBV.

Specifically, FIG. 2 shows a schematic 200 of a control scheme for determining a command to send to a TBV actuator, the TBV actuator adapted to actuate the TBV into a desired position. Schematic 200 may be a control scheme included in an engine controller, such as the controller of control unit 180 shown in FIG. 1. As such, the engine controller may include a first control loop 202 including a peak cylinder pressure controller 204 for adjusting the TBV based on peak cylinder pressure. The peak cylinder pressure controller may receive a peak cylinder pressure (PCP) 206 and subtract the received PCP from a PCP upper limit 208 to determine a PCP error. The PCP upper limit may be stored within a memory of the controller (e.g., in a look-up table as a function of engine operating conditions). The PCP received at the controller may be measured with an engine sensor and/or estimated (e.g., modeled) based on engine operating conditions including one or more of MAP, engine speed, injection timing, fuel rail pressure, intake oxygen concentration, and/or intake manifold temperature. In one example, the PCP is modeled as a function of MAP, engine speed, injection timing, fuel rail pressure, and a modeled intake oxygen concentration. The peak cylinder pressure controller may then generate a first command of a desired position or adjustment to the position of the TBV based on the PCP error. For example, the first command may include a percentage opening (e.g., percentage opening between 0%, or fully closed, and 100%, or fully open). In another example, the first command may be an amount of percentage increase or decrease in the amount of opening of the TBV (e.g., increase opening by 5%).

The engine controller may further include a second control loop 210 including a turbocharger speed controller 212 for adjusting the TBV based on turbocharger speed (e.g., turbine speed of high pressure turbine 125 shown in FIG. 1). The turbocharger speed controller may receive a turbocharger speed (e.g., high pressure turbine speed) 214 and subtract the received turbocharger speed from a turbocharger speed upper limit 216 to determine a turbocharger speed error. The turbocharger speed upper limit may be stored within the memory of the controller (e.g., in a look-up table as a function of engine operating conditions). Additionally, the turbocharger speed received at the controller may be measured with a turbocharger speed sensor arranged on the turbocharger shaft or turbine coupled with the TBV. The turbocharger speed controller may then generate a second command of a desired position or adjustment to the position of the TBV based on the turbocharger speed error.

The engine controller may further include a third control loop 218 including a TBV pressure differential controller 220 for adjusting the TBV based on a pressure difference across the TBV. For example, the pressure difference across the TBV may be a difference between a pressure directly upstream of the turbine and TBV, referred to herein as a turbine inlet pressure (TIP), and a pressure directly downstream of the turbine and the TBV, referred to herein as a turbine outlet pressure (TOP). The TBV pressure differential controller may receive a TBV pressure differential 222 determined from a difference between the TIP and TOP. The TIP and TOP may be measured by pressure sensors positioned upstream and downstream of the turbine (and TBV), such as pressure sensors 181 and 182 shown in FIG. 1. The TBV pressure differential controller may then subtract the measured TBV pressure differential from a TBV pressure differential upper limit 224 to determine a TBV pressure differential error. The TBV pressure differential upper limit may be stored within the memory of the controller (e.g., in a look-up table as a function of engine operating conditions). The TBV pressure differential controller may then generate a third command of a desired position or adjustment to the position of the TBV based on the TBV pressure differential error.

The engine controller may then determine an actual command to send to the TBV actuator 226 based on the first, second, and third commands of the desired position of the TBV. For example, at 228, the controller may determine a maximum position command out of all three of the commands received from the peak cylinder pressure controller, the turbocharger speed controller, and the TBV pressure differential controller and use that value as the command send to the TBV actuator. For example, the maximum position command may be the greatest amount of bypass (e.g., greatest amount of opening) of the TBV such that all the limit values are simultaneously met. After receiving the command of the TBV position, the TBV actuator moves (e.g., adjusts) the TBV into the commanded position. Adjusting the TBV may include one or more of increasing an opening of the TBV, decreasing an opening of the TBV, fully closing the TBV, or fully opening the TBV. Each control loop may include a feedback loop, 230, 232, and 234, for feeding back the final commanded TBV position (for uses such as controller anti-wind) to each of the peak cylinder pressure controller, the turbocharger speed controller, and the TBV pressure differential controller.

The inventors herein have recognized issues with the control scheme depicted in FIG. 2. For example, the control scheme of FIG. 2 requires three separate control loops (and controllers) for controlling a single valve actuator. This may increase the complexity of controlling the TBV, including increasing the difficulty of determining how and when to switch from one controller to another while ensuring a smooth or bumpless transition. This is of particular concern when the controllers contain integrators which must be re-initialized at transition or use some method of anti-windup. As a result, control of the TBV may be delayed and/or degraded. The effort required in developing, tuning, and maintaining the control function increases dramatically because three separate controllers need to be designed. Furthermore, lack of a common controller may result in additional controllers to be added to the TBV control scheme. For example, if a fourth (or fifth) function or protection is added which requires the actuation of the TBV, a fourth (or fifth) controller may need to be added to the TBV control scheme shown in FIG. 21.

In order to decrease the control complexity, the number of controllers (e.g., regulators) and transitions between the different controllers may be reduced. Instead of controlling the TBV based on three separate reference values (e.g., the PCP, turbocharger speed, and TBV pressure differential limits), each of the different reference values corresponding to the different operating parameters shown in FIG. 2 may be converted to a single common reference value. Said another way, each of the different reference values, or limits, may be converted to a common unit, such as pressure, and scaled to a common reference value, such as a common intake manifold pressure (MAP) reference. Then a single, common controller (instead of the three shown in FIG. 2) may determine a desired TBV position and command the TBV based on the desired TBV position.

Figure 3:
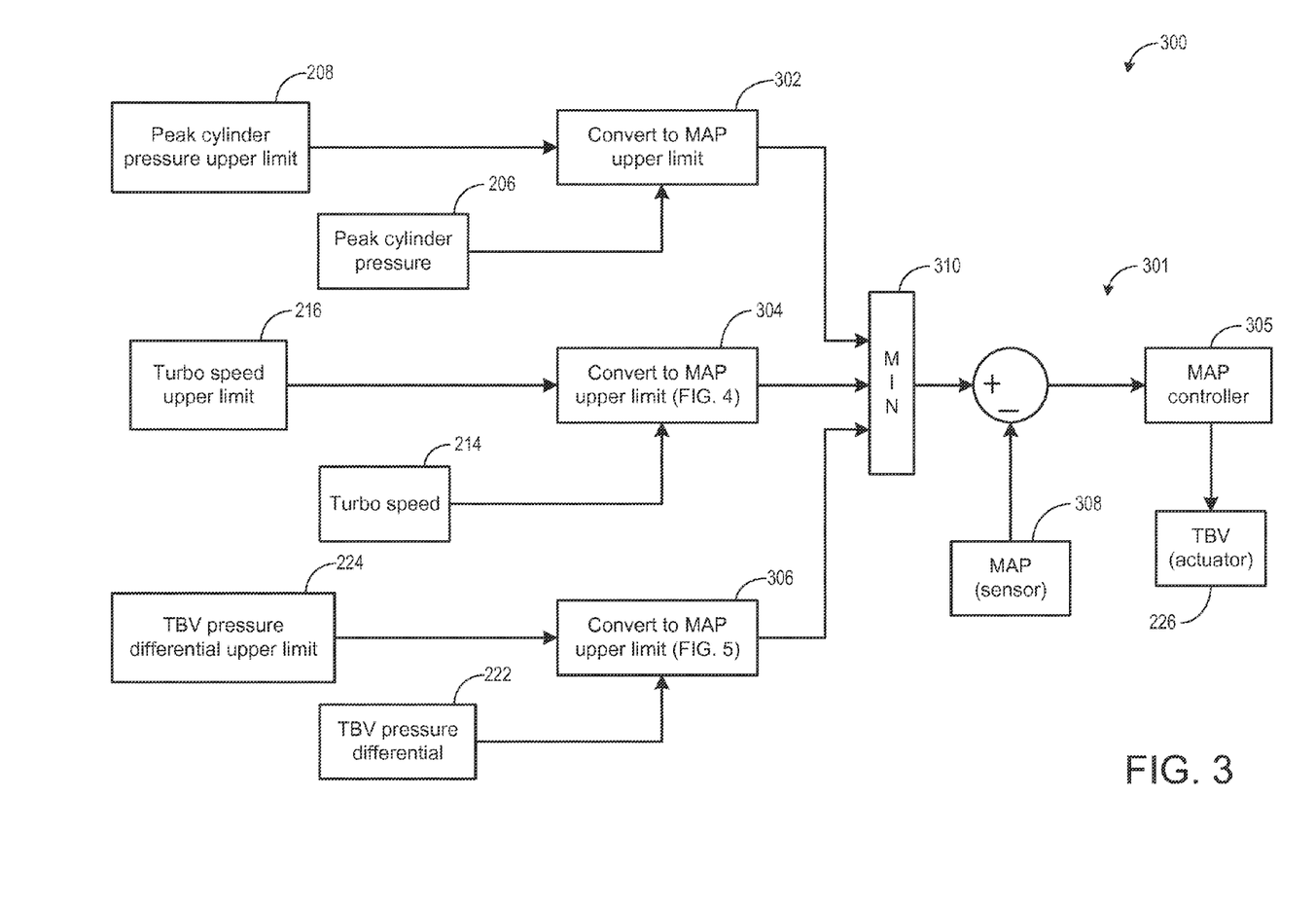
FIGS. 3-5 show schematics of a second control scheme for adjusting a turbine bypass valve according to an embodiment of the invention.

FIG. 3 shows a schematic 300 of a control scheme for adjusting the TBV based on input from a single control loop with a single controller (e.g., regulator). Schematic 300 may be a control scheme included in an engine controller, such as the controller of control unit 180 shown in FIG. 1. As such, the engine controller may include a single control loop 301 including a MAP controller 305. The MAP controller may be the only controller in the control scheme for commanding the TBV. The control scheme shown in FIG. 3 may use similar methods, measured and/or estimated values, and upper limits as those described above with regard to the control scheme of FIG. 2. As such, similar input values are like numbered between FIGS. 2 and 3.

The control scheme shown in schematic 300 may include converting all the upper limits used to control the TBV to MAP values (e.g., MAP upper limits or references). In this way, all the upper limits may have the same units (pressure) and may be scaled to comparable MAP values. For example, the engine controller may convert the peak cylinder pressure upper limit 208 to a first MAP upper limit at 302. The method at 302 may include converting the PCP upper limit to the first MAP upper limit using one or more conversion factors. The one or more conversion factors may be based on parameters impacting PCP during compression and combustion in the engine cylinders. In one example, a relationship between the PCP upper limit and MAP used at 302 may be:

$$MAP_{UL} = (PCP_{UL} - C2)/C1,$$

Where $MAP_{UL}$ is the MAP upper limit, $PCP_{UL}$ is the PCP upper limit, C1 is a function of parameters impacting PCP due to compression, and C2 is a function of parameters impacting PCP due to combustion.

The engine controller may also convert the turbocharger speed upper limit 216 to a second MAP upper limit at 304. The method at 304 is shown in more detail at FIG. 4. The conversion method shown at FIG. 4 includes utilizing a differential analysis to convert from changes in turbine speed (e.g., high pressure turbine speed) to changes in MAP. More specifically, the controller may convert a difference between a turbocharger speed upper limit and turbocharger speed (e.g., a measured turbocharger speed) to a difference between a MAP upper limit and MAP (e.g., a measured MAP). The controller may then determine the MAP upper limit.

Figure 4:
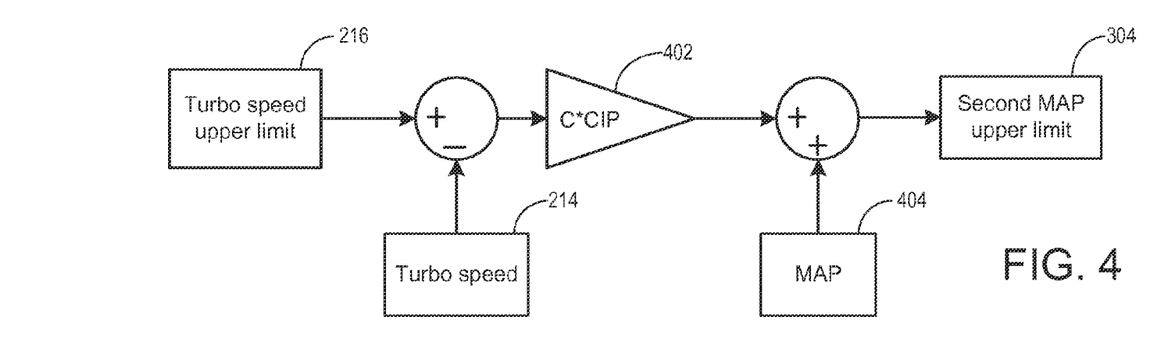

As shown at FIG. 4, the controller takes a difference between the turbocharger speed upper limit 216 and the received turbocharger speed 214 (e.g., turbine speed). As described above, the received turbocharger speed may be a measured turbine speed (e.g., rotational speed of the high pressure turbine). At 402, the difference between the turbine speed limit and the measured turbine speed is multiplied by a variable gain factor defined by compressor inlet pressure (CIP) and a conversion factor, C. The CIP is a pressure measured at an inlet of the compressor (e.g., upstream of the compressor), the compressor mechanically coupled to the turbine. The conversion factor may be a factor representing the trajectory, θ, into the turbine speed limit from the current operating turbine speed, as shown by the example turbocharger compressor map 600 shown in FIG. 6. The trajectory, θ, may be represented by the conversion factor, C, in the sense that C is defined by the change in compressor pressure ratio, PR, divided by the change in turbocharger speed at the present operating conditions. When C is defined in this manner, and CIP is assumed to be constant across this arbitrary compressor PR and turbocharger speed change, the resulting change in turbo speed (e.g., difference between turbocharger speed upper limit 216 and received turbocharger speed 214) is accurately converted to a change in MAP (e.g., difference between the second MAP upper limit 304 and MAP 404).

Figure 6:
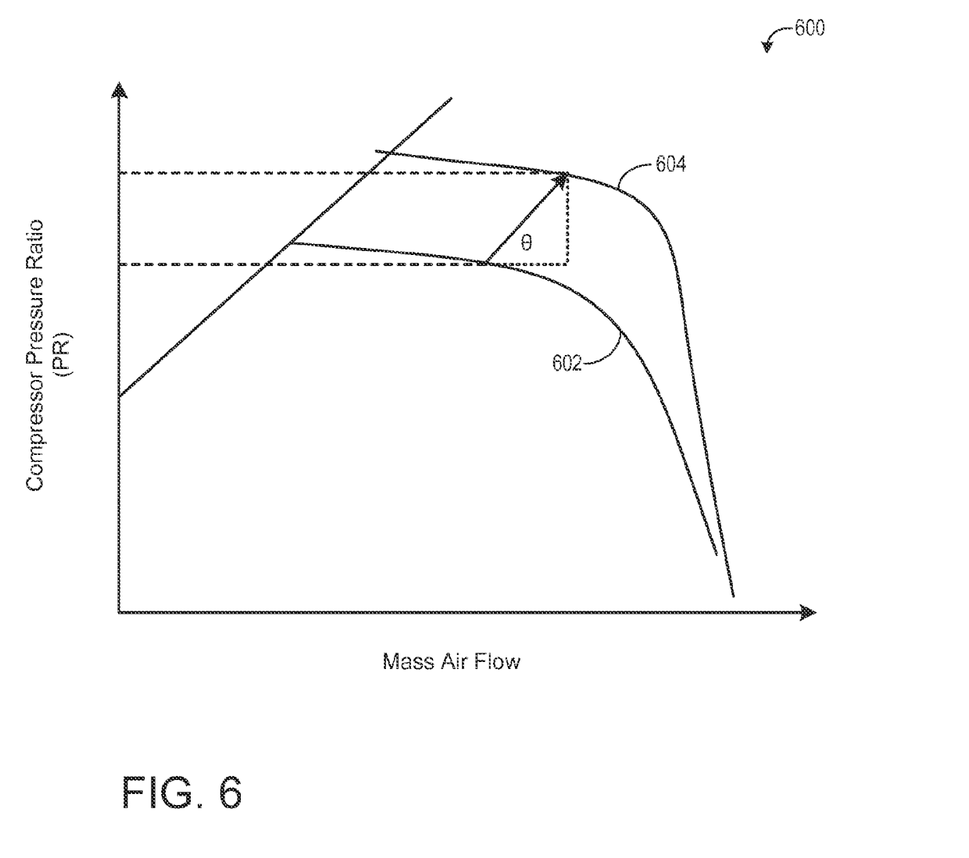
FIG. 6 shows a graph of a turbocharger compressor map according to an embodiment of the invention.
Figure 7:
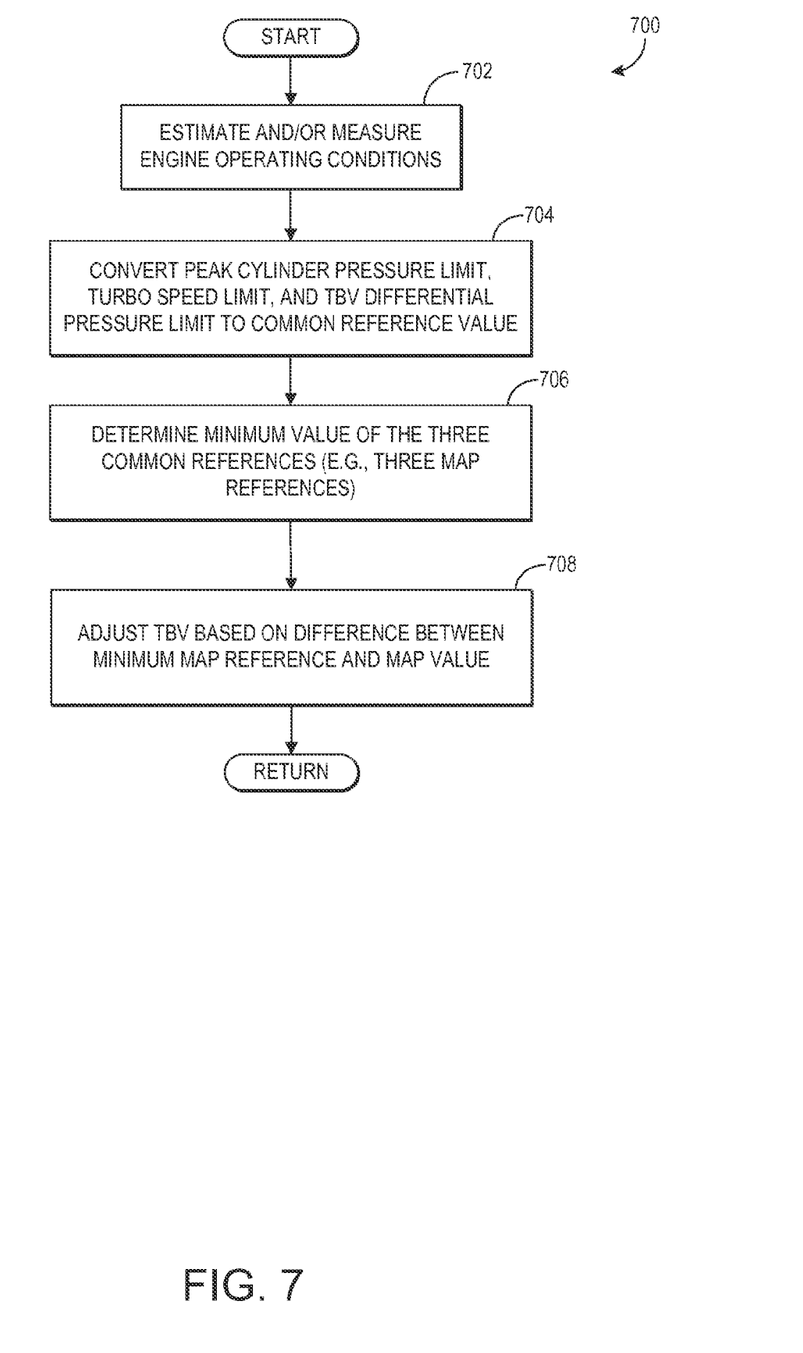
FIG. 7 shows a method for adjusting a turbine bypass valve based on a single, common reference value according to an embodiment of the invention.

As shown in FIG. 6, the compressor map includes a compressor pressure ratio, PR, on the y-axis and mass air flow through the compressor on the x-axis. The compressor PR may be a ratio between compressor outlet and inlet pressure. The curves on the compressor map represent turbocharger speed lines (e.g., speed of the turbocharger and turbine). A first curve 602 represents current, or measured, turbocharger speed (e.g., high pressure turbine speed). A second curve 604 represents the turbocharger speed upper limit. As explained above, the conversion factor C represents the trajectory θ from the current operating turbocharger speed to the turbocharger speed upper limit. The conversion factor C may vary based on additional engine operating conditions. Thus, in one example, the conversion factor C may be chosen to be the lowest possible trajectory θ which equates to a lower (e.g., more conservative from a turbocharger speed protection basis) MAP limit. In this way, the conversion factor C is a function of measured compressor PR and mass air flow through the compressor.

Returning to FIG. 4, the resulting value after multiplying by the conversion factor C and the CIP at 402 is then added with the current MAP at 404 to determine the second MAP upper limit at 304. The current MAP may be a measured MAP measured from a sensor positioned in the intake manifold of the engine.

Figure 5:
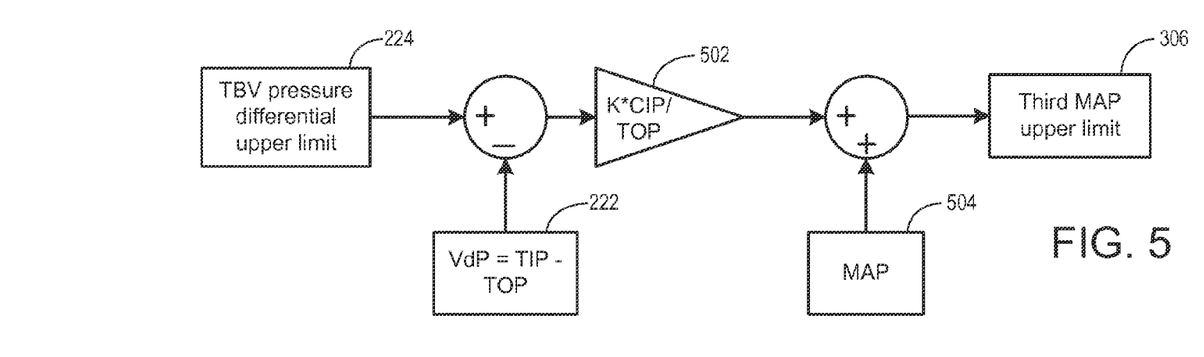

Returning to FIG. 3, the engine controller may also convert the TBV pressure differential upper limit 224 to a third MAP upper limit at 306. The method at 306 is shown in more detail at FIG. 5. The conversion method shown at FIG. 5 includes utilizing a differential analysis to convert from changes in TBV differential pressure, VdP, to changes in MAP. More specifically, the controller may convert a difference between a TBV differential pressure upper limit and TBV differential pressure (e.g., a measured TBV differential pressure) to a difference between a MAP upper limit and MAP (e.g., a measured MAP). The controller may then determine the MAP upper limit. As discussed above, VdP is the pressure difference across the turbine and TBV. Thus, VdP may be defined as the difference between turbine inlet pressure, TIP, and turbine outlet pressure, TOP. As shown at FIG. 5, the controller takes a difference between the VdP upper limit 224 and VdP 222, VdP=TIP−TOP. The TIP and TOP may be measured from sensors directly upstream and directly downstream of the turbine (e.g., sensors 181 and 182 shown in FIG. 1).

At 502 the difference between the VdP upper limit and the measured VdP is multiplied by a conversion factor, K, and a ratio between CIP and TOP. The model shown in FIG. 5 may assume that compressor pressure ratio (PR) remains proportional to the turbine PR, with a proportionality constant of K. In some examples, the controller may adjust turbocharger operation in order to maintain the compressor PR substantially proportional to the turbine PR. The conversion factor K may be pre-determined (e.g., determined empirically) and stored in the memory of the controller. In some examples, the conversion factor K may be specific to a specific turbocharger. In another example, the conversion factor K may be an average conversion factor K for a set of turbochargers. Additionally, CIP may be a measured value and the model shown in FIG. 5 may assume that CIP remains constant from the current measured CIP value to the CIP at the VdP upper limit. When the conversion constant K represents the proportionality between the compressor PR and the turbine PR, and the CIP is assumed to be constant in this manner, the resulting change in VdP (e.g., difference between the TBV pressure differential upper limit 224 and actual VdP 222) is accurately converted to a change in MAP (e.g., difference between the third MAP upper limit 306 and MAP 504).

The resulting value after multiplying by the variable gain factor at 502 is then added with the current MAP at 504 to determine the third MAP upper limit at 306. The current MAP may be a measured MAP measured from a sensor positioned in the intake manifold of the engine. In this way, each of the peak cylinder pressure upper limit, the turbocharger speed upper limit, and the TBV pressure differential upper limit are converted to equivalent MAP upper limits using various conversion schemes, as described above.

Returning to FIG. 3, at 310, the controller determines a minimum value of the first MAP upper limit, the second MAP upper limit, and the third MAP upper limit. The current measured MAP value 308 is then subtracted from the determined minimum MAP upper limit to determine a MAP error (e.g., the variance in the measured MAP from the MAP upper limit). The MAP controller at 305 then determines a desired position of the TBV based on the MAP error. In one example, the MAP controller may determine a percentage opening of the TBV. In another example, the MAP controller may determine an amount (e.g., percentage) by which the TBV needs to be further opened or closed. The MAP controller then sends a command (e.g., signal) to the TBV actuator 226. As a result, the TBV actuator actuates the TBV into the desired position. The TBV cannot go to negative positions. As such, the minimum TBV position may be a closed position. This may require anti-windup to be considered in the controller for the situation when peak cylinder pressure is less than the peak cylinder pressure upper limit, turbo speed is less than the turbo speed upper limit, and the TBV pressure differential is less than the TBV pressure differential upper limit.

In an alternate embodiment, the control scheme for adjusting the TBV shown in FIG. 3 may utilize a different number of MAP upper limit inputs at 310, other than the three shown. For example, the MAP controller may only adjust the TBV (or alternate boost control actuator) based on two received MAP upper limits, instead of the three shown in FIG. 3. In this way, the MAP limit used to adjust the TBV may only be based on two of the peak cylinder pressure, turbocharger speed, and TBV pressure differential upper limits (e.g., there may be only two input variables to the MIN function 310 upstream of the MAP controller). In another example, the MAP controller may adjust the TBV based on four or more received MAP upper limits, each of the four or more MAP upper limits based on different operating parameters. In this way, alternate or additional operating parameters to those shown in FIG. 3 may be used to determine a single, common MAP upper limit used to adjust the TBV. In all cases, each of the operating parameter limit values are converted to the same common reference parameter and then a single, common MAP reference (e.g., limit) may be used to adjust the TBV.

In yet another embodiment, the control scheme of FIG. 3 may be used to adjust a different boost control actuator other than the TBV. For example, the output of the MAP controller at 305 may be used to alternatively adjust an actuator of a variable geometry turbine (VGT) or another type of boost control actuator that controls the MAP.

As shown in FIGS. 3-5, various limits may be converted to MAP limits. By utilizing differential analysis, as explained above with reference to FIGS. 4-5, changes in TBV differential pressure (e.g., the difference between the TBV differential pressure limit and the estimated or measured TBV differential pressure) and changes in turbine speed (e.g., the difference between the turbine speed limit and the estimated or measured turbine speed) may be converted to changes in MAP (e.g., the difference between a MAP limit and the estimated or measured MAP). Converting the changes in TBV differential pressure and changes in turbine speed is done by multiplying by the variable gain factors (as shown at 402 and 502). When the turbine speed or the TBV differential pressure (e.g., actual estimated or measured value) approach their respective limit values, the changes (or differences) between the limit and measured values approaches zero. As a result, when multiplying this difference by the variable gain factor, the accuracy of this conversion is increased since multiplying by essentially zero is still zero. Thus, the conversions shown in FIGS. 4 and 5 will have increased accuracy as the measured values approach the limit values. In this way, the conversion schemes shown in FIGS. 4-5 have increased accuracy over different conversion schemes that may convert one limit to another limit with a gain factor (instead of converting one difference to another difference). Converting one limit to another limit using a gain factor may result in a noise factor, or error, that is not present in the method described above with reference to FIGS. 3-5.

Turning now to FIG. 7, a method 700 is shown for adjusting the TBV based on a single, common reference value. The method may be carried out by an engine controller, such as the controller included in control unit 180 shown in FIG. 1. As such, instructions for carrying out method 700 may be stored in a memory of the controller. Further, method 700 may include executing the control schemes shown in FIGS. 3-5.

The method begins at 702 by estimating and/or measuring engine operating conditions. Engine operating conditions may include peak cylinder pressure (PCP), MAP, TIP, TOP, the differential pressure across the TBV, TBV position, turbine speed (e.g., turbocharger speed), mass air flow through the compressor, engine mass air flow, or the like. At 704, the method includes converting each of the peak cylinder pressure limit, the turbocharger speed limit, and the TBV differential pressure limit to a common reference value. Converting each of these limits to the common reference value includes converting each of the limits to a common unit and then scaling each of the limits to the common reference value. As described above, the common reference unit may be pressure and the common reference value may be MAP. As such, each of the peak cylinder pressure limit, the turbocharger speed limit, and the TBV differential pressure limit may be converted to a first MAP reference (e.g., upper limit), a second MAP reference, and a third MAP reference. As described above, each of the MAP references may be an upper limit value (or threshold).

In alternate embodiments, the method at 704 may include converting each of the peak cylinder pressure limit, the turbocharger speed limit, and the TBV differential pressure limit to an alternate common unit and common reference value. In one example, the common unit may be pressure and the common reference value may be peak cylinder pressure. In another example, the common reference value may be turbine speed, TBV differential pressure, air-fuel ratio, exhaust oxygen concentration, air mass flow, or exhaust mass flow.

Returning to FIG. 7, at 706 the method includes determining the minimum value out of the first, second, and third MAP references. Said another way, at 706, the controller may determine the smallest MAP reference out of the first, second, and third converted MAP references. At 708, the method includes adjusting the TBV based on a difference between the minimum MAP reference and a measured MAP value (e.g., current operating MAP). For example, if the difference between the minimum MAP reference and the measured MAP value is negative, the method may include increasing the opening of the TBV. In another example, if the difference between the minimum MAP reference and the measured MAP value is positive, the method may include decreasing the opening of the TBV. In yet another example, the method at 708 includes adjusting the TBV if the measured MAP is within a threshold of the minimum MAP reference. As a result, the controller may adjust the TBV in order to maintain the MAP at or below the minimum MAP reference value. As discussed above, the controller may send a signal to the TBV actuator to actuate the TBV into a desired position based on the difference between the minimum MAP reference and the measured MAP.

In this way, the TBV may be adjusted based on a single, common reference value such as MAP. For example, the actuator of the TBV may be controlled from one controller (e.g., regulator) which determines a desired position of the TBV based on only one reference value relative to only one measured value. As a result, the control complexity of controlling the TBV to maintain a plurality of parameters below upper limits may be reduced. By converting multiple different limit values (e.g., PCP, turbine speed, and VdP) to a single common reference value (e.g., MAP) and controlling the TBV based on the common reference value and not each of the different limit values, a technical effect of the invention is achieved. In this way, TBV control complexity may be reduced while still protecting the engine from peak cylinder pressures, turbine speeds, and/or TBV pressure differentials that may result in engine component degradation. In addition, additional control growth is more easily accommodated. If one or more control or protection functions need to be added to the TBV control scheme, which also require adjustment of the TBV, this differential analysis method or another method may be employed to convert these additional references to the common reference (e.g., MAP) for the TBV. In this way, additional control or protection functions can be accommodated in the control scheme shown in FIG. 3 with the addition of no new controllers (e.g., regulators). Additionally, as described above, converting a difference in a limit value and a measured value to a difference in a MAP limit and a measured MAP value (as shown in FIGS. 4-5), may increase the accuracy of the determined MAP limit and thus result in more accurate control of the TBV (or alternate turbine boost control actuator).

As one embodiment, a method for an engine comprises adjusting a turbine boost control actuator (such as a turbine bypass valve) to control an intake manifold pressure to a limit, the limit based at least in part on one or more of peak cylinder pressure, turbine speed, and/or a pressure difference across a turbine. The limit may be a common intake manifold pressure limit and the method further comprises adjusting the turbine boost control actuator based on the common intake manifold pressure limit and a measured intake manifold pressure. The turbine boost control actuator may be one of a turbine bypass valve or a variable geometry turbine actuator. In one example, when the turbine boost control actuator is the turbine bypass valve, the method comprises increasing an opening of the turbine bypass valve when the measured intake manifold pressure is greater than the common intake manifold pressure limit.

The method further comprises determining a first difference between a limit of a pressure difference across the turbine and the pressure difference across the turbine; and a second difference between a turbine speed limit and the turbine speed, the first difference converted to a first intake manifold pressure difference and the second difference converted to a second intake manifold pressure difference, wherein the limit is based on the first intake manifold pressure difference and the second intake manifold pressure difference.

Additionally, the method comprises converting each of a peak cylinder pressure limit, a turbine speed limit, and a limit of a pressure difference across the turbine to a common reference unit. In one example, the common reference unit is pressure. The method further comprises converting the peak cylinder pressure limit to a first intake manifold pressure limit, converting the turbine speed limit to a second intake manifold pressure limit, and converting the limit of the pressure difference across the turbine to a third intake manifold pressure limit. The method then comprises taking a minimum of the first intake manifold pressure limit, the second intake manifold pressure limit, and the third intake manifold pressure limit to determine the common intake manifold pressure limit.

In one example, converting the peak cylinder pressure limit to the first intake manifold pressure limit includes converting the peak cylinder pressure limit to the first intake manifold pressure limit using a conversion factor, the conversion factor based on parameters impacting peak cylinder pressure during compression and combustion. In another example, converting the turbine speed limit to the second intake manifold pressure limit includes converting the turbine speed limit to the second intake manifold pressure limit based on a measured intake manifold pressure, a difference between the turbine speed limit and a measured turbine speed, a compressor inlet pressure, and a conversion factor based on a compressor pressure ratio difference and the difference between the turbine speed limit and the measured turbine speed. In yet another example, converting the limit of the pressure difference across the turbine to the third intake manifold pressure limit includes converting the limit of the pressure difference across the turbine to the third intake manifold pressure limit based on a conversion factor, a compressor inlet pressure, a turbine outlet pressure, a turbine inlet pressure, and the measured intake manifold pressure.

As another embodiment, a system comprises a controller configured to adjust a turbine boost control actuator (such as a turbine bypass valve) to control an intake manifold pressure to a limit, the limit based at least in part on one or more of peak cylinder pressure, turbine speed, and/or a pressure difference across a turbine.

As yet another embodiment, a method for an engine comprises adjusting a turbine bypass valve based on an intake manifold pressure and an intake manifold pressure limit, the intake manifold pressure limit based on a peak cylinder pressure reference, a turbine speed reference, and a third reference of a pressure difference across the turbine bypass valve. The method further comprises determining a first common reference pressure based on a relationship between the peak cylinder pressure reference and a first peak cylinder pressure conversion factor based on peak cylinder pressure due to compression and a second peak cylinder pressure conversion factor based on peak cylinder pressure due to combustion. Additionally, the method comprises determining a second common reference pressure based on the intake manifold pressure, a compressor inlet pressure, a difference between the turbine speed reference and an actual turbine speed, and a turbine speed conversion factor, wherein the turbine speed conversion factor is a ratio between a change in compressor pressure ratio and a change in turbine speed. Further still, the method comprises maintaining a compressor pressure ratio proportional to a turbine pressure ratio and determining a third common reference pressure based on the third reference (i.e., the reference of the pressure difference across the turbine bypass valve), the compressor inlet pressure, a turbine inlet pressure, a turbine outlet pressure, the intake manifold pressure, and a turbine pressure differential conversion factor. In one example, the intake manifold pressure limit is a minimum of the first common reference pressure, the second common reference pressure, and the third common reference pressure, where the first, second, and third common reference pressures are intake manifold pressures.

As another embodiment, a system comprises a controller configured to adjust a turbine bypass valve based on an intake manifold pressure and an intake manifold pressure limit, the intake manifold pressure limit based on a peak cylinder pressure reference, a turbine speed reference, and a third reference of a pressure difference across the turbine bypass valve.

As yet another embodiment, a system comprises a controller configured to adjust a turbine bypass valve routing exhaust around a turbine of a turbocharger based on an intake manifold pressure measured by an intake manifold pressure sensor and a single common reference pressure, the single common reference pressure based on a peak cylinder pressure, a speed of the turbine, and a pressure differential across the turbine bypass valve relative to respective upper limits. The controller if further configured to receive a first intake manifold pressure upper limit, a second intake manifold pressure upper limit, and a third intake manifold pressure upper limit and select a minimum of the received first, second, and third intake manifold pressure upper limits to determine the single common reference pressure. Additionally, the controller is further configured to convert a peak cylinder pressure upper limit to the first intake manifold pressure upper limit, convert a turbine speed upper limit to the second intake manifold pressure upper limit, and convert a pressure differential upper limit of the turbine bypass valve to the third intake manifold pressure upper limit. Further still, the controller is configured to adjust a position of the turbine bypass valve with a single actuator of the turbine bypass valve when the intake manifold pressure is within a threshold of the single common reference pressure. Further, the turbine drives a compressor and a pressure ratio of the compressor is substantially proportional to a pressure ratio of the turbine.

As still another embodiment, a method comprises adjusting a turbine bypass valve routing exhaust around a turbine of a turbocharger based on an intake manifold pressure measured by an intake manifold pressure sensor and a single common reference pressure, the single common reference pressure based on a peak cylinder pressure, a speed of the turbine, and a pressure differential across the turbine bypass valve relative to respective upper limits.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for an engine, comprising:
adjusting a turbine bypass valve based on an intake manifold pressure and an intake manifold pressure limit, the intake manifold pressure limit based on a peak cylinder pressure reference, a turbine speed reference, and a third reference of a pressure difference across the turbine bypass valve.

2. The method of claim 1, further comprising determining a first common reference pressure based on a relationship between: the peak cylinder pressure reference; a first peak cylinder pressure conversion factor that is based on peak cylinder pressure due to compression; and a second peak cylinder pressure conversion factor that is based on peak cylinder pressure due to combustion.

3. The method of claim 2, further comprising determining a second common reference pressure based on the intake manifold pressure, a compressor inlet pressure, a difference between the turbine speed reference and an actual turbine speed, and a turbine speed conversion factor, wherein the turbine speed conversion factor is a ratio between a change in compressor pressure ratio and a change in turbine speed.

4. The method of claim 3, further comprising maintaining the compressor pressure ratio proportional to a turbine pressure ratio and determining a third common reference pressure based on the third reference, the compressor inlet pressure, a turbine inlet pressure, a turbine outlet pressure, the intake manifold pressure, and a turbine pressure differential conversion factor.

5. The method of claim 4, wherein the intake manifold pressure limit is a minimum of the first common reference pressure, the second common reference pressure, and the third common reference pressure.

6. The method of claim 4, wherein the first, second, and third common reference pressures are intake manifold pressures.

7. A method for an engine, comprising:
adjusting a turbine boost control actuator to control an intake manifold pressure to an intake manifold pressure limit determined based at least in part on each of a measured peak cylinder pressure relative to a peak cylinder pressure limit, a measured turbine speed relative to a turbine speed limit, and a measured pressure difference across a turbine relative to a limit of a pressure difference across the turbine.

8. The method of claim 7, wherein the intake manifold pressure limit is a common intake manifold pressure limit and further comprising adjusting the turbine boost control actuator based on the common intake manifold pressure limit and a measured intake manifold pressure.

9. The method of claim 8, wherein the turbine boost control actuator is one of a turbine bypass valve and a variable geometry turbine actuator and the method further comprising, when the turbine boost control actuator is the turbine bypass valve, increasing an opening of the turbine bypass valve when the measured intake manifold pressure is greater than the common intake manifold pressure limit.

10. The method of claim 8, further comprising determining: a first difference between the limit of the pressure difference across the turbine and the measured pressure difference across the turbine; and a second difference between the turbine speed limit and the measured turbine speed, the first difference converted to a first intake manifold pressure difference and the second difference converted to a second intake manifold pressure difference, wherein the common intake manifold pressure limit is based on the first intake manifold pressure difference and the second intake manifold pressure difference.

11. The method of claim 8, further comprising converting each of the peak cylinder pressure limit, the turbine speed limit, and the limit of the pressure difference across the turbine to a common reference unit, wherein the common reference unit is pressure, and further comprising converting the peak cylinder pressure limit to a first intake manifold pressure limit, converting the turbine speed limit to a second intake manifold pressure limit, and converting the limit of the pressure difference across the turbine to a third intake manifold pressure limit.

12. The method of claim 11, further comprising taking a minimum of the first intake manifold pressure limit, the second intake manifold pressure limit, and the third intake manifold pressure limit to determine the common intake manifold pressure limit.

13. The method of claim 11, wherein converting the peak cylinder pressure limit to the first intake manifold pressure limit includes converting the peak cylinder pressure limit to the first intake manifold pressure limit using a conversion factor, the conversion factor based on parameters impacting peak cylinder pressure during compression and combustion.

14. The method of claim 11, wherein converting the turbine speed limit to the second intake manifold pressure limit includes converting the turbine speed limit to the second intake manifold pressure limit based on the measured intake manifold pressure, a difference between the turbine speed limit and the measured turbine speed, a compressor inlet pressure, and a conversion factor based on the difference between the turbine speed limit and the measured turbine speed and a compressor pressure ratio at the turbine speed limit and the measured turbine speed.

15. The method of claim 11, wherein converting the limit of the pressure difference across the turbine to the third intake manifold pressure limit includes converting the limit of the pressure difference across the turbine to the third intake manifold pressure limit based on a conversion factor, a difference between the limit of the pressure difference across the turbine and the pressure difference across the turbine, a compressor inlet pressure, a turbine outlet pressure, and the measured intake manifold pressure.

16. A system, comprising:
a controller configured to adjust a turbine bypass valve routing exhaust around a turbine of a turbocharger based on an intake manifold pressure measured by an intake manifold pressure sensor and a single common reference pressure, the single common reference pressure based on a peak cylinder pressure, a speed of the turbine, and a pressure differential across the turbine bypass valve relative to respective upper limits.

17. The system of claim 16, wherein the controller is further configured to: at least one of receive and determine a first intake manifold pressure upper limit, a second intake manifold pressure upper limit, and a third intake manifold pressure upper limit; and to select a minimum of the received first, second, and third intake manifold pressure upper limits to determine the single common reference pressure.

18. The system of claim 17, wherein the controller is further configured to convert a peak cylinder pressure upper limit to the first intake manifold pressure upper limit, convert a difference between a turbine speed upper limit and the speed of the turbine to a first difference between the second intake manifold pressure upper limit and the intake manifold pressure, and convert a difference between a pressure differential upper limit of the turbine bypass valve and the pressure differential across the turbine bypass valve to a difference between the third intake manifold pressure upper limit and the intake manifold pressure.

19. The system of claim 16, wherein the controller is further configured to adjust a position of the turbine bypass valve with a single actuator of the turbine bypass valve when the intake manifold pressure is a threshold amount below the single common reference pressure.

20. The system of claim 16, wherein the turbine drives a compressor and wherein a pressure ratio of the compressor is proportional to a pressure ratio of the turbine.

* * * * *